July 27, 1943.    P. A. FRANK    2,325,386
FILTER AND METHOD FOR MAKING THE SAME
Filed Aug. 1, 1940
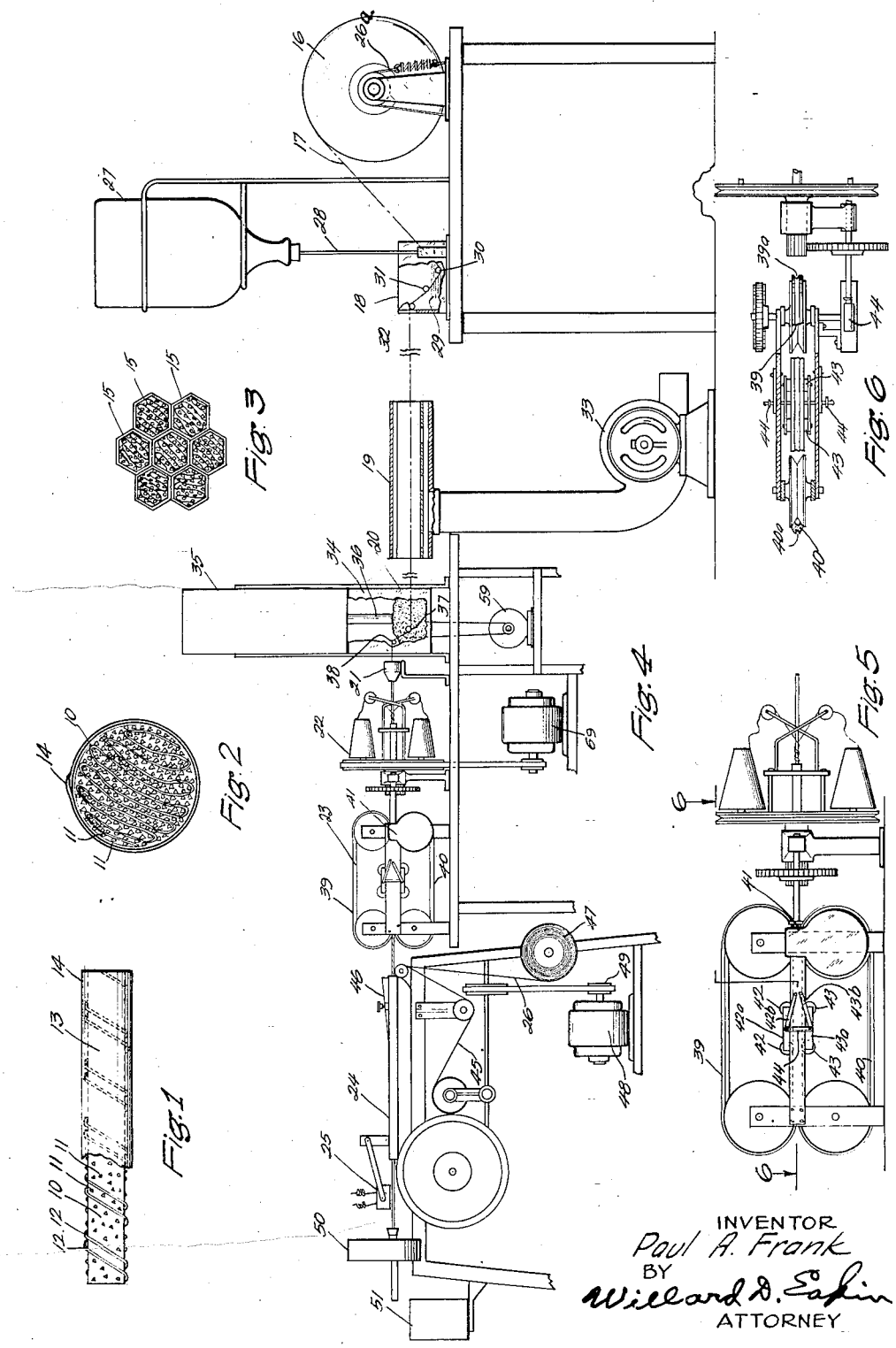
INVENTOR
Paul A. Frank
BY
Willard D. Eakin
ATTORNEY Patented July 27, 1943

2,325,386

UNITED STATES PATENT OFFICE 2,325,386

FILTER AND METHOD FOR MAKING THE SAME

Paul A. Frank, Akron, Ohio

Application August 1, 1940, Serial No. 349,380

7 Claims. (Cl. 210—131)

This invention relates to filters or devices for separating a substance or substances from a fluid, either gaseous or liquid, by absorption or by adsorption, and preferably the latter, as the fluid is caused to pass through the filter or separating device, as in air-conditioning units, oil purification appliances, and gas masks, for example, although it was originally devised for removal of nicotine, tars and other substances from tobacco smoke, and a filter or cartridge adapted to be mounted in a cigarette holder or in a pipe stem will be used for illustrative purposes in this application.

Adsorbents in granular form, such as activated charcoal, activated alumina, and silica gel, have been used heretofore for such purposes but, so far as I am aware, only in the form of a mass of the grains pressed together with an adhesive or binder and thus caused to adhere to each other, or in the form of loose grains retained in a perforate cartridge or the like.

In both forms such use of the materials is expensive and also for several reasons is inefficient. In the case of the compressed mass the binder lessens the amount of flow space between the particles; also it covers, and thus makes inaccessible to the materials to be separated, an excessively large part of the surfaces of the grains. In the case of the loose grains, they have presented high resistance to the passage of the fluid, because of packing, and in both the loose grain form and in the compressed form, the materials have presented unequal flow resistance in different parts of the assemblage, with resulting low efficiency because of the "channeling" of the fluid.

The chief objects of my invention are to avoid these and other disadvantages of the prior art and to provide economy and efficiency in such devices and in their manufacture.

I attain these objects primarily by maintaining the granules in a condition of substantially uniform distribution and relationship, with so little of their surface masked by adhesive that substantially their entire adsorbing capacity is utilized, and in such relation that they act as baffles, deflecting the fluid and thus bringing about a large amount of surface contact but without presenting excessive resistance to the general flow. In doing this I preferably cause the grains to be attached to a thin strip of material such as paper or Cellophane, preferably the material known as vegetable parchment, and preferably by means of an adhesive, such as the rubber film formed from natural rubber latex, adapted to anchor the grains without penetrating them to any substantial extent. The strip, with the grains thus anchored to it, is then so folded or crinkled as to define numerous generally parallel narrow passages having the grains uniformly distributed in them as baffles. Suitable means, such as a Cellophane cover, is then applied to define a general flow passage and thus compel the fluid to flow through the small passages containing the granular baffles.

Of the accompanying drawing:

Fig. 1 is a side elevation of a filtering capsule adapted for insertion in a cigarette holder and embodying and made in accordance with my invention.

Fig. 2 is a cross-section of the same.

Fig. 3 is a cross-section of a modification.

Fig. 4 is a side elevation, with parts in section of preferred apparatus adapted for the practice of my invention.

Fig. 5 is a side elevation of parts of the same, on a larger scale.

Fig. 6 is a section on line 6—6 of Fig. 4.

Referring to the drawing, the filter capsule shown in Figures 1 and 2 comprises a longitudinally folded strip of vegetable parchment 10 having particles of silica gel 11, 11 adhered to it by means of an adhesive such as rubber latex, two helical windings of thread 12, 12 for holding the strip firmly in its folded form, and a Cellophane cover 13 defining the general flow passage and providing a smooth and regular surface for the capsule as a whole, the Cellophane cover 13 being seamed at 14.

In Fig. 3, a plurality of capsules 15, 15 made to interfit with each other by giving them a suitable cross-sectional shape, here shown as hexagonal, are assembled to provide a filter of large cross-section and correspondingly large flow capacity.

The apparatus shown in Figures 4, 5 and 6, for continuous production of the capsules illustrated in Figures 1 and 2, comprises a support for rotatably supporting a roll 16 of vegetable parchment strip 17, a latex-applying bath 18, a dryer 19, a silica-gel-applying device 20, a folding horn 21, a binding-thread winder 22, a strip-pulling device 23, and a cigarette machine 24, modified by omission of the tobacco-feeding device and by addition of an electric heat-seaming device 25, for applying a continuous strip of Cellophane 26 to the continuous strip of assembled filter elements, for progressively seaming it, and for cutting the complete, covered strip into suitable lengths to provide individual capsules such as that shown in Figures 1 and 2.

Associated with the support for the roll 16 of vegetable parchment is a spring-tensioned brake band 26ᵃ for maintaining suitable tension upon the strip 17.

Associated with the latex bath receptacle 18 is an inverted supply container 27 provided with a feed pipe 28 terminating within the bath and thus adapted, as in common practice, to maintain the latex 29 in the bath at a constant level.

The bath receptacle 18 is bridged by a glass guide bar 30 below the liquid level for progressive submergence of the strip 17, and by glass bars 31, 32 above the liquid level for removal of excess latex from the respective faces of the strip and for guiding the strip to the dryer 19, which is provided with a motor-driven blower 33.

The silica-gel-applying device 20 comprises an applying box 34 and a supply container 35 provided with a chute or spout 36 terminating in the box 34 for maintaining a suitable quantity of the silica gel in the box at all times.

For guiding the latex-treated strip 17 through the mass of loose granules of gel and to the folding horn 21 the box is bridged by a roll or bar 37 at a low position and by an outguiding bar 38 at a position above the mass of the gel.

The bar 37 is driven, by a motor 59, to avoid cutting of the paper or parchment strip 17 such as occurs if, with its tacky coating of dried latex, it is drawn past a non-rotating guide bar in the mass of gel.

The folding horn 21 consists simply of a member formed with a conically tapered through passage, and when the strip 17 is once crinkled and started through the horn, with the folds or crinkles of the strip being as shown in Fig. 2, for example, the same cross-sectional design continues to be progressively imposed upon the strip.

The balanced thread winder 22, driven by a motor 69, operates in a well-known manner to apply the helical thread windings 12, 12 to the latex-treated, gel-treated and crinkled strip as the strip is continuously pulled through the winder by the strip-pulling device 23. The latter comprises a pair of belts 39, 40 formed with respective grooves 39ᵃ, 40ᵃ fitting the upper and lower faces respectively of the strip, the belts being driven from the gearing of the thread-winder by suitable gearing including a worm 41.

For causing the adjacent, forwardly moving reaches of the belts to embrace the strip with suitable force to prevent slippage, presser rollers 42, 42 and 43, 43 are mounted upon a pair of saddles 42ᵃ and 43ᵃ which are connected with the framing by pivoted arms or links 42ᵇ, 43ᵇ and are connected with each other by a stretched rubber band 44, Fig. 5.

The cigarette machine 24 comprises the usual strip-feeding and folding belt 45 and folding horn 46, for drawing the Cellophane cover strip 26 from a stock roll 47 and folding about the composite filter-body strip.

The cigarette machine is driven by a motor 48 provided with a variable-speed pulley 49 for proper timing of the pulling-and-folding belt 45 with the pulling belts 39, 40.

The electric heat-seaming device 25 is pivoted so that it rides upon the overlapped margins of the Cellophane cover strip and by applying heat and pressure to them progressively joins them in a seam.

The cut-off device of the cigarette machine is diagrammatically represented at 50 and is adapted, as in the case of cigarettes, to cut the assembled and covered strip into successive short lengths and permit them to fall into a receiving box 51.

Various modifications are possible within the scope of the invention as defined by the appended claims.

For example, the strip to which the granules are adhered can be of aluminum foil or other sheet material and various adhesives, such as aroclor, paraffine, and synthetic rubber substitutes, can be used.

I claim:

1. A filter comprising a multiplicity of granular particles adapted to retain at least one of the substances to be filtered, strip material continuous and substantially rectilinear longitudinally throughout the length of the filter and having longitudinal zones which define between them a multiplicity of longitudinally extending through-passages, an adhesive holding the particles in fixed relation to the strip material, the particles holding the zones of the strip material spaced apart with substantial uniformity throughout the filter, and means for compelling a fluid to have its general flow longitudinally of said zones and passages, through the filter.

2. A filter as defined in claim 1 in which the recited means is a flexible, substantially impervious, single wrap, longitudinally seamed wrapper.

3. A filter as defined in claim 1 which includes an obliquely helical winding of strip material holding the defined zones in fixed relation.

4. A filter as defined in claim 1 in which the adhesive is substantially non-penetrating with relation to the particles.

5. The method of making a filter which comprises feeding strip material past a succession of treating stations and at respective stations performing the following succession of steps: (a) progressively applying an adhesive to the strip material; (b) progressively applying a multiplicity of particles of a granular filtering substance to the adhesive; (c) laterally diverting a multiplicity of zones of the strip material into close face-to-face relation to each other as the assembly passes the diverting stations so that said zones are held spaced apart with substantial uniformity throughout the cross-section of the assembly by the particles; (d) securing the strip material and the particles in that relationship by progression lengthwise of the assembly as the assembly passes the securing station.

6. A method as defined in claim 5 in which the securing step (d) is performed by applying to the assembly a longitudinally progressing helical winding of strip material.

7. A method as defined in claim 5 in which a flexible wrapper of substantially impervious sheet material in strip form is applied longitudinally to the assembly by progression lengthwise of the assembly as the assembly passes the wrapper-applying station and is longitudinally seamed by progression lengthwise of the assembly as the assembly passes the seaming station.

PAUL A. FRANK.